United States Patent
Terlesky et al.

(10) Patent No.: US 7,223,851 B2
(45) Date of Patent: May 29, 2007

(54) NUCLEIC ACID-BINDING POLYMERS

(75) Inventors: Kathy Terlesky, Charlottesville, VA (US); Chris Earle, Ruckersville, VA (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 502 days.

(21) Appl. No.: 10/359,084

(22) Filed: Feb. 6, 2003

(65) Prior Publication Data

US 2004/0157217 A1 Aug. 12, 2004

(51) Int. Cl.
  *C07H 21/00* (2006.01)
  *C07H 21/02* (2006.01)
  *C12Q 1/68* (2006.01)

(52) U.S. Cl. .................. 536/23.1; 536/24.3; 536/26.6; 435/6

(58) Field of Classification Search ............... 536/23.1, 536/24.3, 26.6; 435/6
See application file for complete search history.

(56) References Cited

U.S. PATENT DOCUMENTS

| | | | |
|---|---|---|---|
| 3,969,261 A | 7/1976 | Meiller | |
| 4,335,017 A | 6/1982 | Miles et al. | |
| 4,336,161 A | 6/1982 | Rosevear et al. | |
| 4,385,991 A | 5/1983 | Rosevear et al. | |
| 4,816,499 A | 3/1989 | Nomura et al. | |
| 4,835,263 A * | 5/1989 | Nguyen et al. | 536/24.3 |
| 4,921,805 A | 5/1990 | Gebeyehu et al. | |
| 5,134,110 A | 7/1992 | Sudo et al. | |
| 5,234,991 A | 8/1993 | Tayot et al. | |
| 5,599,667 A | 2/1997 | Arnold, Jr. et al. | |
| 5,776,672 A | 7/1998 | Hashimoto et al. | |
| 5,833,861 A | 11/1998 | Afeyan et al. | |
| 5,959,098 A | 9/1999 | Goldberg et al. | |
| 6,004,752 A | 12/1999 | Loewy et al. | |
| 6,013,440 A | 1/2000 | Lipshutz et al. | |
| 6,057,103 A | 5/2000 | Short | |
| 6,057,377 A | 5/2000 | Sasaki et al. | |
| 6,127,306 A | 10/2000 | Hüsing et al. | |
| 6,191,173 B1 | 2/2001 | Schwertfeger et al. | |
| 6,238,869 B1 | 5/2001 | Kris et al. | |
| 6,277,489 B1 | 8/2001 | Abbott et al. | |
| 6,280,950 B1 | 8/2001 | Lipshutz et al. | |
| 6,307,042 B1 | 10/2001 | Goldberg et al. | |
| 6,310,110 B1 | 10/2001 | Markowitz et al. | |
| 6,312,894 B1 * | 11/2001 | Hedgpeth et al. | 435/6 |
| 6,403,320 B1 | 6/2002 | Read et al. | |
| 6,441,159 B1 | 8/2002 | Lukhtanov et al. | |
| 6,468,751 B1 | 10/2002 | Adams et al. | |
| 6,495,645 B1 | 12/2002 | Okano et al. | |
| 2001/0034375 A1 | 10/2001 | Schwertfeger et al. | |
| 2002/0034747 A1 | 3/2002 | Bruchez, Jr. et al. | |
| 2004/0071654 A1 * | 4/2004 | Anderson et al. | 424/78.37 |

FOREIGN PATENT DOCUMENTS

| | | |
|---|---|---|
| WO | WO 99/10539 | 3/1999 |
| WO | WO 01/53325 A2 | 7/2001 |

OTHER PUBLICATIONS

"Dynabeads Oligo(dT)25 (Prod. No. 610.02/05/50)" Jan. 21, 2003, published by Dynal Biotech, 1 page.
"Dynabeads Oligo(dT)25—Package Insert" Jan. 21, 2003, published by Dynal Biotech, 8 pages.
"Dynabeads DNA DIRECT Universal (Prod. No. 630.06)" Jan. 21, 2003, published by Dynal Biotech, 1 page.
"Introduction to Surface-Activated Dynabeads" Jan. 21, 2003, published by Dynal Biotech, 2 pages.
"Surface amino groups" Jan. 21, 2003, published by Dynal Biotech, 1 page.
"Dynabeads M-270 Amine (Prod. No. 143.07/08)" Jan. 21, 2003, published by Dynal Biotech, 1 page.
"Applications of Surface Activated Dynabeads" Jan. 21, 2003, published by Dynal Biotech, 1 page.
"Dynabeads M-270 Carboxylic Acid (Prod. No. 143.05/06)" Jan. 21, 2003, published by Dynal Biotech, 1 page.
"PCR-ready DNA from Cultured Cells- Protocol" Jan. 21, 2003, published by Dynal Biotech, 1 page.
"Dynabeads DNA DIRECT Universal—Package Insert (Automated Isolation)" Jan. 21, 2003, published by Dynal Biotech, 13 pages.
"Dynabeads DNA DIRECT Universal—Package Insert (Manual Isolation)" Jan. 21, 2003, published by Dynal Biotech, 7 pages.
"Frequently Asked Questions (FAQs)—DNA Isolation" Jan. 21, 2003, published by Dynal Biotech, 3 pages.
"Which mRNA Kit to Choose?" Jan. 21, 2003, published by Dynal Biotech, 2 pages.
"Frequently Asked Questions (FAQs)—RNA Isolation" Jan. 21, 2003, published by Dynal Biotech, 3 pages.
"Minor Groove Binders" Nov. 21, 2002, published by Epoch Biosciences, 3 pages.
"Drugs targeting DNA and RNA" Nov. 21, 2002, published by University of Maryland, 5 pages.

* cited by examiner

*Primary Examiner*—Jezia Riley
(74) *Attorney, Agent, or Firm*—Steptoe & Johnson LLP

(57) ABSTRACT

The present invention relates to a nucleic acid binding polymer which has affinity for nucleic acid molecules such as DNA, RNA, or hybrids thereof. The polymer is comprised of a nucleic acid binding backbone linked to a nucleic acid binding agent, preferably by a linking moiety. The polymer can be used to isolate and purify nucleic acid molecules from a variety of sample types including but not limited to clinical and environmental.

20 Claims, No Drawings

NUCLEIC ACID-BINDING POLYMERS

This invention was made with government support under contract # TSWG 157113-0041-0001. The government has certain rights in this invention.

DESCRIPTION OF THE INVENTION

The present invention relates to nucleic acid binding polymers which have affinity for binding nucleic acid molecules such as DNA or RNA. These nucleic acid-binding polymers exhibit improved binding to nucleic acid sequences and can have a broad spectrum of use including isolation and purification of double stranded DNA or RNA or DNA/RNA hybrids from aqueous samples under a variety of conditions, e.g. osmotic, etc. Specifically, the polymers can be used to isolate, purify and concentrate nucleic acids from samples wherein the concentrated nucleic acids such as DNA can be further manipulated, e.g. PCR amplification. These polymers may find use in a variety of applications including but not limited to clinical and environmental applications and for laboratory DNA manipulations.

The nucleic acid binding polymers of this invention are comprised of a backbone polymer linked with a nucleic acid-binding agent by a linking moiety (bifunctional linker). The generalized formula of the preferred binding polymer is:

Backbone Polymer—Bifunctional linker—Nucleic acid binding agent

While the bifunctional linker is preferred, it is not necessary.

In one embodiment, the invention relates to a nucleic acid binding polymer wherein the backbone polymer binds to a nucleic acid molecule by hydrogen bonding.

In another embodiment, the invention relates to a nucleic acid binding polymer wherein the backbone polymer binds to a nucleic acid molecule by electrostatic or cationic interaction.

In one preferred embodiment, the invention relates to a nucleic acid binding polymer which comprises a linear polyacrylamide (LPA) linked with an intercalating agent by a bifunctional linker (linking moiety).

In another preferred embodiment, the invention relates to a nucleic acid binding polymer which is a linear polyacrylamide linked to an intercalating agent, e.g. psoralen, as shown below.

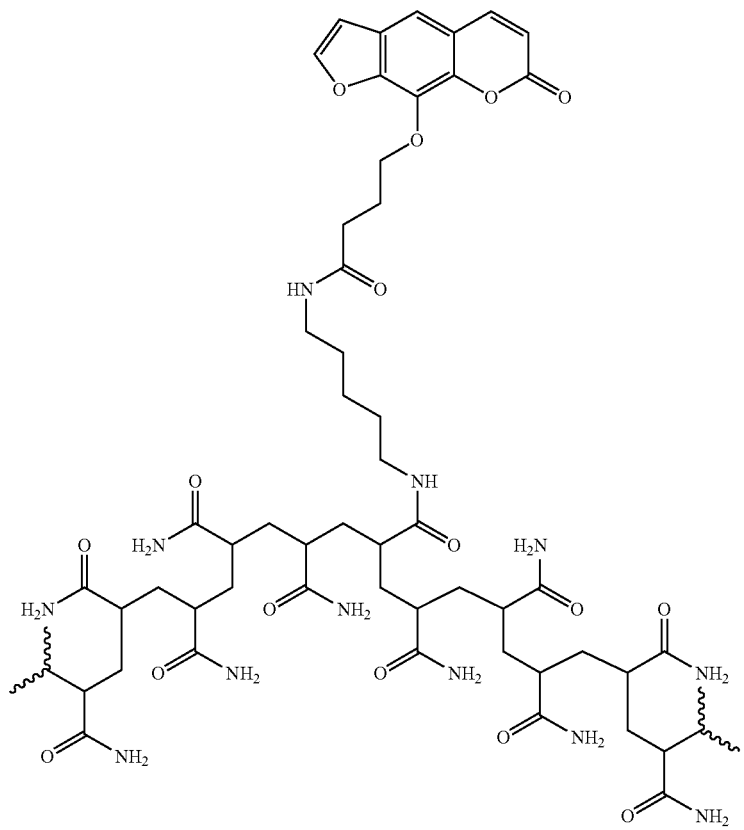

In one embodiment, the invention relates to a nucleic acid binding polymer linked with a nucleic acid-binding agent by a linking moiety (bifunctional linker) and wherein said nucleic acid binding polymer remains soluble after binding to the nucleic acid molecule.

In another embodiment, the invention relates to a nucleic acid-binding polymer which comprises an intercalating agent which is ethidium, ethidium bromide, methidium, acridine, aminoacridine, acridine orange and derivatives thereof, psoralen, proflavin, ellipticine, actinomycin D, daunomycin, malachite green, phenyl neutral red, mitomycin C, HOECHST 33342, HOECHST 33258, aclarubicin, DAPI, SYBR, Adriamycin, pirarubicin, actinomycin, tris (phenanthroline) zinc salt, tris (phenanthroline) ruthenium salt, tris (phenantroline) cobalt salt, di (phenanthroline) zinc salt, di (phenanthroline) ruthenium salt, di (phenanthroline) cobalt salt, bipyridine platinum salt, terpyridine platinum salt, phenanthroline platinum salt tris (bipyridyl) zinc salt, tris (bipyridyl) ruthenium salt, tris (bipyridyl) cobalt salt di (bipyridyl) zinc salt, di (bipyridyl) ruthenium salt, di (bipyridyl) cobalt salt, etc.

In another embodiment, the invention relates to a nucleic acid-binding polymer which comprises instead of or in addition to an intercalating agent a minor groove binder such as Hoechst 33258, netropsin, distamycin, plicamycin, CDPI.sub.1–3, lexitropsin, mithramycin, chromomycin A.sub.3, olivomycin, anthramycin, sibriromycin, pentamidine, stilbamidine, berenil, etc. Binding agents acting as both intercalating agents and minor groove binders can also be used.

In another embodiment, the invention relates to a nucleic acid binding polymer wherein the linking moiety (bifunctional linker) is N-Boc-1,3-diaminopropane, N-Boc-1,4-diaminobutane, N-Boc-1,5-diaminopentane, N-Boc-1,6-diaminohexane, 3-(Boc-amino)-1-propanol, 4-(Boc-amino)-1-butanol, 5-(Boc-amino)-1-pentanol, 6-(Boc-amino)-1-hexanol, Nα-Boc-L-lysine, NE-Boc-L-lysine, and Nα-Boc-L-serine methyl ester or other linkers commonly used in the art, e.g., of affinity chromatography.

In another embodiment, the invention relates to a nucleic acid binding polymer comprising a nucleic acid-binding agent linked by a linking moiety (bifunctional linker) to the backbone polymer and wherein the linking moiety is linked to the nucleic acid binding agent by an amide, ester, ether, thioether, carbamate, urea or amine bond.

In another embodiment, the invention relates to a method for isolating a nucleic acid, such as but not limited to, double stranded DNA or RNA or hybrids thereof, from an aqueous sample comprising reacting the sample with a nucleic acid binding polymer of this invention, e.g., comprising an intercalating agent and/or a minor groove binder linked by a linker moiety.

In a preferred embodiment, the invention relates to a method for isolating a nucleic acid, such as but not limited to, double stranded DNA or RNA or hybrids thereof, from an aqueous sample comprising reacting the sample with a nucleic acid binding polymer which comprises a linear polyacrylamide linked to an intercalating agent and/or a minor groove binder by a linker moiety.

In another embodiment, the invention relates to a method for isolating a nucleic acid from an environmental or clinical sample which may contain a nucleic acid by reacting the sample with a nucleic acid binding polymer which is linked to an intercalating agent or minor groove binder with a linking moiety.

In another embodiment, the invention relates to a nucleic acid binding polymer which comprises a backbone polymer linked to a molecule which has both groove binding and intercalating properties.

In a preferred embodiment, the invention relates to a method for isolating a nucleic acid from an environmental or clinical sample which may contain a nucleic acid by reacting the sample with a nucleic acid binding polymer which comprises a linear polyacrylamide which is linked to an intercalating agent or minor groove binder with a linker moiety.

In another embodiment, the invention relates to a method for isolating a nucleic acid for PCR amplification comprising reacting the sample with a nucleic acid binding polymer which comprises a linear polyacrylamide linked to a nucleic acid binding agent with a linker moiety.

The backbone polymer is a polymer which is capable of binding to a nucleic acid molecule by hydrogen, electrostatic or cationic binding and remains soluble after binding. Examples of such polymers which can bind to nucleic acids by hydrogen bonding or electrostatic binding or cationic binding and remain soluble after binding can be readily found in the prior art using the guidance of this application. Examples of backbone polymers include but are not limited to polymers having pendant OH, $NH_2$, COOH, or quaternary ammonium groups having at least one H atom (and up to two N-substituents, e.g., $C_{1-8}$ alkyl, $C_{1-8}$ alkoxyalkyl, arylalkyl, e.g., benzyl etc.). Suitable polymers can thus be prepared from monomers such as acrylic acid, acrylates, acrylamides, glycols, amino acids, (e.g., naturally occurring, synthetic, modified etc.) substituted styrenes, etc. The backbone polymer can contain a variety of different functional groups and substituents as long as the hydrogen binding or electrostatic or cationic binding properties of the polymer to the nucleic acid are still effective and the solubility of the bound polymer is maintained. Some non-limiting examples are mentioned below.

Some type of polymers in general applicable to this invention include:

polyesters of α-, β-, γ- or ε-hydroxy carbonic acids, polyalkyl-cyanoacrylates, polyamino acids, polyamides, polyacrylated saccharides, polyorthoesters, polylactic acid, poly-ε-caprolactone, copolymers of lactic acid and glycol acid or ε-caprolacton, polyhdroxybutyric acid, polyhydroxyvaleric acid, copolymers of hydroxybutyric and hydroxyvaleric acid, polymers of glutamic acid and/or lysine, polydioxanone, polymers or copolymers of amino acids and/or terephthalic acid, phthalic acid or sebacic acid, polyacryldextran, polyacryl starch, polyacrylamide, polyurethane, polyesters, polyacetal, polyaminotriazol, polyalkylcyanoacrylate, etc.

Selections will be made in consideration of the guidance of this application, biodegradability of the polymer details considered, components likely to be in the test sample, etc.

The invention further relates, for example, to a nucleic acid binding polymer comprising a linear polyacrylamide which can contain derivativatized units of the acrylamide monomer. Acrylamide derivatives include functional groups on the side chains of the acrylamide, e.g., homopolymers and copolymers of the monomers described in U.S. Pat. No. 6,495,645, incorporated herein by reference. Many other such derivatives are also employed as will be clear to the skilled worker. Suitable derivatives of the acrylamide monomers can have the following general formula (I):

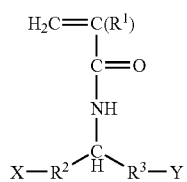

wherein $R^1$ represents a hydrogen atom, a straight-chain or branched alkyl group containing 1 to 6 carbon atoms or a $C_{3-6}$ cycloalkyl group, $R^2$ and $R^3$ each independently represent an alkylene group containing 1 to 6 carbon atoms or $R^2$ and $R^3$ may be combined to form a ring with the linking carbon atom, X represents a hydrogen atom, an amino group, a hydroxyl group, a halogen atom, a carboxyl group or a —COOR$^4$ group wherein R$^4$ represents a C$_{1-6}$ straight-chain or branched alkyl, C$_{3-6}$ cycloalkyl, phenyl, substituted phenyl, benzyl, or substituted benzyl group, and Y represents an amino group, a hydroxyl group, a halogen atom, a carboxyl group or a —COOR$^4$ group wherein R$^4$ represents a C$_{1-6}$ straight-chain or branched alkyl, C$_{3-6}$ cycloalkyl, phenyl, substituted phenyl, benzyl or substituted benzyl group, etc.

The invention further relates to polymers consisting of identical or different repeating units of the following general formula (II):

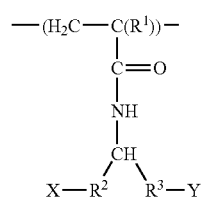

wherein R$^1$ represents a hydrogen atom, a straight-chain or branched alkyl group containing 1 to 6 carbon atoms or a C$_{3-6}$ cycloalkyl group, R$^2$ and R$^3$ each independently represent an alkylene group containing 1 to 6 carbon atoms or R$^2$ and R$^3$ may be combined to form a ring with the linking carbon atom, X represents a hydrogen atom, an amino group, a hydroxyl group, a halogen atom, a carboxyl group or a —COOR$^4$ group wherein R$^4$ represents a C$_{1-6}$ straight-chain or branched alkyl, C$_{3-6}$ cycloalkyl, phenyl, substituted phenyl, benzyl, or substituted benzyl group, and Y represents an amino group, a hydroxyl group, a halogen atom, a carboxyl group or a —COOR$^4$ group wherein R$^4$ represents a C$_{1-6}$ straight-chain or branched alkyl, C$_{3-6}$ cycloalkyl, phenyl, substituted phenyl, benzyl or substituted benzyl group, etc.

The invention further relates to polymers consisting of identical or different repeating units of the following general formula (III):

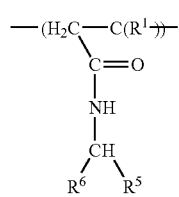

wherein R$^1$ represents a hydrogen atom, a straight-chain or branched alkyl group containing 1 to 6 carbon atoms or a C$_{3-6}$ cycloalkyl group, R$^5$ represents a straight-chain or branched alkyl group containing 1 to 6 carbon atoms or a C$_3$-6 cycloalkyl group, and R$^6$ represents a straight-chain or branched alkyl group containing 1 to 6 carbon atoms or a C$_{3-6}$ cycloalkyl group, or R$^5$ and R$^6$ may be combined to form a 3-, 4-, 5 or 6 membered ring in which the —CH— group to which they are attached is one member.

The present invention also provides copolymers comprising different or identical monomeric repeating units such as those mentioned above with each other or with other comonomers not necessarily having hydrogen bonding or electrostatic or cationic properties. The present invention thus relates to for example copolymers of acrylamide and any of the above monomers, e.g. derivatized acrylamide monomers. Methods for the preparation of acrylamide copolymers are well known to those of skill in the art.

In the present invention, the straight chain or branched alkyl groups containing 1 to 6 carbon atoms include methyl, ethyl, n-propyl, i-propyl, n-butyl, i-butyl, s-butyl, t-butyl, n-pentyl, and n-hexyl groups. In the present invention, the alkylene groups containing 1-6 carbon atoms include monomethylene, dimethylene, trimethylene, tetramethylene, pentamethlyene and hexamethylene groups. The halogen atom means any of fluorine, chlorine, bromine, and iodine atoms.

When the "R" groups are combined to form a ring it is preferably cyclopropane, cyclobutane, cyclopentane, cyclohexane, cyclooctane, etc.

In the present invention, the acrylamide monomers can include substitutions on the NH group as mentioned. The substitution can include mono- or di-substitutions. Further, the acrylamide monomer can include substitutions on the carbon chain. The substitutions on the carbon chain can include any of a variety of types (e.g., alkyl, halo carboxy, hydroxy, etc.) with the prerequisite that the solubility of the polymer and the binding properties of the nucleic acid binding polymer are still effective.

Acrylamide monomers of the present invention can be prepared, for example, by reacting a compound of general formula (IV):

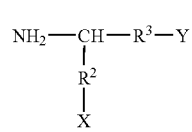

wherein R$^2$ represents a straight-chain or branched alkyl group containing 1 to 6 carbon atoms, R$^3$ represents an alkylene group containing 1 to 6 carbon atoms, Y represents an amino group, a hydroxyl group, a halogen atom, a carboxyl group, a COOR$^4$ group wherein R$^4$ represents a C$_{1-6}$ straight-chain or branched alkyl, C$_{3-6}$ cycloalkyl, phenyl, substituted phenyl, benzyl or substituted benzyl group, etc. X represents a hydroxyl group, a halogen atom, a carboxyl group, an ester group represented by —COOR$^4$ wherein R$^4$ represents a C$_{1-6}$ straight-chain or branched alkyl, phenyl, substituted phenyl, benzyl, or susbtituted benzyl group, or a substituted amino group represented by —NH—R$^7$ wherein R$^7$ represents a C$_{1-6}$ straight-chain or branched alkyl, a C$_{3-6}$ cycloalkyl, alkyloxycarbonyl, phenyl, substituted phenyl, benzyl, substituted benzyl, benzyloxycarbonyl or substituted benzyloxycarbonyl group, or R$^2$ and R$^3$ may be combined to form a ring, with a compound of general formula (V):

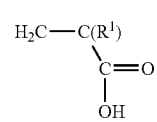

wherein R$^1$ represents a hydrogen atom or a straight-chain or branched alkyl group containing 1 to 6 carbon atoms. The compound of general formula (V) includes acrylic acid, methacrylic acid, α-ethylacrylic acid, α-n-butylacrylic acid and α-n-hexylacrylic acid, some of them are commercially available and all which can be routinely prepared.

The molecular weights of the polyacrylamide and other backbone polymers of the present invention are not particularly critical. Any molecular weight will suffice as long as the mentioned properties and functions are retained. Molecular weights can be determined using size exclusion dialysis and other chromatographic methods well known in the art. For example, the molecular weight of the entire nucleic acid binding polymer comprising linear polyacrylamide linked with the nucleic acid binding agent, psoralen, of Example 1 was determined to be between 100,000 and 1,000,000 daltons using size exclusion dialysis (see e.g., John M. Clark, *Experimental Biochemistry*, 2d edition (1977) W.H. Freeman and Company). Further, the mole % of psoralen in the polymer was determined to be between 0.002% and 0.004% using UV absorbance spectroscopy and the extinction coefficient of psoralen. Typically, the backbone polymer has a molecular weight (weight average) on the order of about 10,000 or more, e.g., 50,000 or more, 100 thousand or more, e.g., a few (1–5) hundred thousand, a million or more, etc.

The number of bifunctional linkers will be identical to the number of intended intercalating agents or minor groove binders. For example, in the case of the polyacrylamide linked with psoralen, the mole % of linker (i.e, monomer with linker to monomer without linker) will be essentially the same as the mole % of psoralen, e.g 0.002% to 0.004%, based on total content of polymerization mixture, but lower and higher amounts being readily possible, e.g., 0.0001%, 0.001%, 0.01%, 0.1%, 1%, etc.

For synthesis purposes, the intercalating agent or minor groove binder can be attached to the acrylic acid monomer with a linking moiety. All derivatized monomers will contain e.g., one acyl group, one linker, and one intercalating agent or minor groove binder. The linker-derivatized monomer, is polymerized or more typically is polymerized after it is added to non-linker derivatized acrylamide and the mixture is polymerized.

Preferably, the backbone polymers contain no substituents which can cause crosslinking, linear polymers being preferred.

The backbone polymer can be conventionally prepared using well known methods, e.g. by polymerizing the selected monomers in a ratio which produces the desired ratio of linked to unlinked monomeric units and then bonding to the nucleic acid binding entity. Alternatively, the linked monomer can be reacted with the latter first and then polymerized with the unlinked monomers, etc.

The nucleic acid binding polymer of the invention is water soluble, i.e., it dissolves in water sufficiently to permit the attached nucleic acid binding agent to be bound to a target nucleic acid in aqueous solution while the entire complex remains solubilized. Such operations are conducted under essentially the same conventional conditions (e.g., salinity, temperature, additives, etc.) employed in conventional usage of the nucleic acid binding agents, e.g., intercalating agents, etc.

Intercalating Agents

In the present invention, the nucleic acid binding polymer is linked to a nucleic acid binding agent, e.g., an intercalating agent (intercalator).

The intercalating agent or compound useful for nucleic acid, e.g., DNA binding is an agent or moiety capable of insertion between stacked base pairs in the nucleic acid double helix. Examples of nucleic acid intercalating agents are well known in the art and any of them without limitations can be used in the presently claimed invention. A list of commonly used intercalating agents is shown in Table 1 and many discussed below.

The terms "intercalating moiety" or "intercalator" are known in the art to refer to those compounds capable of non-covalent insertion between the base pairs of a nucleic acid duplex and are specific in this regard only to double-stranded (ds) portions of nucleic acid structures including those portions of single-stranded nucleic acids which have formed base pairs, such as in "hairpin loops". The nucleic acid structures can be dsDNA, dsRNA or DNA-RNA hybrids. The term "intercalating agent or intercalator" is also used to describe the insertion of planar aromatic or heteroaromatic compounds between adjacent base pairs of double stranded DNA (dsDNA), or in some cases dsRNA.

DNA intercalating agents utilizing ethidium bromide have been used in various DNA analytical procedures. The intercalating agents are characterized by their tendency to intercalate specifically to double stranded nucleic acid such as double stranded DNA or RNA. Some intercalating agents have in their molecules a flat intercalating group such as phenyl group, which intercalates between the base pairs of the double stranded nucleic acid, whereby binding to the double stranded nucleic acid. Most of the intercalating agents are optically active and some of them are used in quantification of nucleic acids. Certain intercalating agents exhibit electrode response. Therefore, determination of physical change, especially optical or electrochemical change, may serve to detect the intercalating agents bound to a double stranded nucleic acid.

Electrochemically or optically active intercalating agents are, but are not limited to, ethidium, ethidium bromide, acridine, aminoacridine, acridine orange, proflavin, ellipticine, actinomycin D, daunomycin, mitomycin C, HOECHST 33342, HOECHST 33258, aclarubicin, DAPI, Adriamycin, pirarubicin, actinomycin, tris (phenanthroline) zinc salt, tris (phenanthroline) ruthenium salt, tris (phenantroline) cobalt salt, di (phenantroline) zinc salt, di (phenanthroline) ruthenium salt, di (phenanthroline) cobalt salt, bipyridine platinum salt, terpyridine platinum salt, phenanthroline platinum salt, tris (bipyridyl) zinc salt, tris (bipyridyl) ruthenium salt, tris (bipyridyl) cobalt salt, di (bipyridyl) zinc salt, di (bipyridyl) ruthenium salt, di (bipyridyl) cobalt salt, and the like. Other intercalating agents are those listed in Published Japanese Patent Application No. 62-282599.

In addition to the intercalating agents which are reversibly reacted themselves during oxidation-reduction reaction as listed above, the determination of electrochemical change using an electrode may employ a metal complex containing as a center metal a substance capable of undergoing electrically reversible oxidation-reduction reaction, namely, a metallo intercalator. Such metallo intercalators include for example tris (phenanthroline) zinc salt, tris (phenanthroline) ruthenium salt, tris (phenanthroline) cobalt salt, di (phenthroline) zinc salt, di (phenanthroline) ruthenium salt, di (phenanthroline) cobalt salt, bipyridine cobalt salt, terpyridine platinum salt, phenanthroline platinum salt, tris (bipyridyl) zinc salt, tris (bipyridyl) ruthenium salt, tris (bipyridyl) cobalt salt, di (bipyridyl) zinc salt, di (bipyridyl) ruthenium salt, di (bipyridyl) cobalt salt and the like. Although the intercalating agents are not limited to those listed above, the complexes which or whose center metals have oxidation-reduction potentials not lower than or covered by that of nucleic acids are less preferable.

By using the intercalating agents capable of undergoing electrochemically reversible oxidation-reduction reaction, it is possible to determine the oxidation-reduction current repetitively. Accordingly, it is possible to conduct potential scanning several to several hundred times and to sum up the values of the signals obtained, whereby enabling the amplification of the signals, resulting in a higher sensitivity of the detection.

Intercalating agents which exhibit electrochemiluminescence may also be employed. Such intercalating agents are, but are not limited to, for example, luminol, lucigenin, pyrene, diphenylanthracene rubrene and acridinium derivatives. The electrochemiluminescene of the intercalating agents listed above may be enhanced by the enhancers such as luciferin derivatives such as firefly luciferin and dihydroluciferin, phenols such as phenyl phenol and chlorophenol as well as naphthols.

Optical signals generated by the electrochemiluminescence may directly be detected from the solution using, for example, photocounter. Alternatively, an optical fiber electrode produced by forming a transparent electrode at the tip of an optical fiber may also be used to detect the signal indirectly.

Because most of the intercalating agents have themselves optical activity or can exhibit an electrode response, direct determination is possible by means of optical or electrochemical procedures. When these intercalating agents are further bound with the substances which generate signals capable of being detected directly or indirectly, higher detection sensitivity can be obtained by determining the signals combined with the signals from the intercalating agents. These substances which generate signals capable of being detected directly or indirectly include, for example, haptens such as biotin, trinitrobenzene sulfonic acid and dinitrobenzene sulfonic acid, fluorescent substances such as fluorescein isothiocyanate (FITC), phycocyanin and rhodamine, luminescent substances such as luminol, lucigenin and acridium ester derivatives as well as electrode active substances such as ferrocene and viologen. When using the substance from which the signal cannot be directly detected, such as the haptens listed above, enzyme-labelled antihapten antibodies such as enzyme-labelled avidin are used to determine the optical parameters such as absorbance, fluorescene, luminescene, quenching, circular dichroism and fluorescene polarization or, electrode activity is determined, whereby indirectly detecting the gene. Although one molecule of these substances is usually bound to one molecule of an intercalating agent, several molecules of these substances may be bound to one molecule of the intercalating agent, whereby enhancing the sensitivity.

Various reported DNA intercalating agents utilizing ethidium bromide have been described in the literature, see e.g., Christen, et al., *Anal. Biochem.*, 178 (2), May 1, 1989, pp. 269–272 and Petersen, S. E., *Cytometry*, 7(4), July 1986, pp. 301–306.

In "Ethidium Bromide in the Detection of Antibodies to DNA and of Circulating DNA by Two-Stage Counterimmunoelectrophoresis", J. Immunol. Methods, 85 (1), Dec. 17, 1985, pp. 217–220, Riboldi, et al., report that in an attempt to overcome the limitations of counterimmunoelectrophoresis in the detection of precipitating anti-DNA antibodies or circulating DNA, ethidium bromide was used to increase the visibility of the precipitating lines and to confirm their specificity.

W. A. Denny reported in "DNA-Intercalating Ligands as Anti-Cancer Drugs: Prospects for Future Design", *Anticancer Drug Des.*, 4 (4), December, 1989, pp. 241–263, that interest in DNA-intercalating ligands as anti-cancer drugs has developed greatly since the clinical success of doxorubicin.

A number of agents have been described for labeling nucleic acids, whether probe or target, for facilitating detection of target nucleic acid. Suitable labels may provide signals detectable by fluorescence, radioactivity, colorimetry, X-ray diffraction or absorption, magnetism or enzymatic activity, and include, for example, fluorophores, chromophores, radioactive isotopes, enzymes, and ligands having specific binding partners. All are useful herein.

Fluorescent dyes are also suitable for detecting nucleic acids. For example, ethidium bromide is an intercalating agent that displays increased fluorescence when bound to double stranded DNA rather than when in free solution. Ethidium bromide can be used to detect both single and double stranded nucleic acids, although the affinity of ethidium bromide for single stranded nucleic acid is relatively low. Ethidium bromide is routinely used to detect nucleic acids following gel electrophoresis. Following size fractionation on an approximate gel matrix, for example, agarose or acrylamide, the gel is soaked in a dilute solution of ethidium bromide.

The use of fluorescence labeled polynucleotide probes and polynucleotide hybridization assays has been reported. According to these methods, probes are prepared by attaching particular absorber-emitter moieties to the 3' prime and 5' prime ends of the nucleic acid fragments. The fragments are capable of hybridizing to adjacent positions of a target DNA so that if both fragments are hybridized, the proximity of the absorber and emitter moieties results in the detectable emitter fluorescence. According to these methods, the fluorescent dye is introduced into the target DNA after all in vitro nucleic acid polymerizations have been completed. The inhibitory effects of intercalating agents on nucleic acid polymerases have been described in numerous publications.

DNA binding dyes are useful as antibiotics because of the inhibitory effects of nucleic acid replication processes that result from the agent binding to the template. The use of intercalating agents for blocking infectivity of influenza or herpes viruses has been reported. It has also been reported and described that a number of DNA binding agents, both intercalators and nonintercalators, inhibit nucleic acid replication. For example, ethidium bromide inhibits DNA replication.

The intercalating agent useful for DNA binding or detecting amplified nucleic acids is an agent or moiety capable of insertion between stacked base pairs in the nucleic acid double helix. Intercalating agents such as ethidium homodimer and ethidium bromide fluoresce more intensely when intercalated into double stranded DNA than when bound to single stranded DNA, RNA, or in solution.

Conventional electroconductive threading intercalators have a structure comprising a core portion of a naphthalene-diimide cyclic group, a pair of linker portions each of which is attached to each of the two ends of the core portion, and a pair of electroconductive ferrocene moieties each of which is attached to the other end of each linker. The ferrocene moiety has an oxidation-reduction activity and a conjugated system in which electrons freely move. Makino et al. in U.S. Pat. No. 6,368,807 teach an improved electrochemical detection procedure at a low electric potential applied to the electrode using an improved electroconductive threading intercalator compound.

Over the last decade, studies using rhodium intercalators containing phenanthrenequinone-diimine (phi) ligands displayed tight DNA binding by preferential intercalation, some with affinities and specificities approaching DNA-binding proteins as taught by Barton et al. in U.S. Pat. No. 6,221,586.

Also, it is well known that certain fluorescence-emitting dyes have the ability to become inserted noncovalently or intercalated between bases in the double-stranded helix. For example, 9-aminoacridine, a planar, heterocyclic molecule, is one such compound. Ethidium bromide, a phenanthridine dye, is another Such intercalating agent. Publications describing the use of intercalating dyes in studies using nucleic acids include Georghiou, Photochemistry and Photobiology, 26:59–68, Pergamon Press (1977); Kubota, et al., Biophys. Chem., 6:279–284 (1977); Genest, et al., Nuc. Ac. Res., 13:2603–2615 (1985); Asseline, EMBO J., 3: 795–800 (1984); Richardson, et. al., U.S. Pat. No. 4,257,774; and Letsinger, et. al., U.S. Pat. No. 4,547,569.

Rabbani et al., in U.S. Pat. No. 6,239,271 and in U.S. Pat. No. 5,998,135, teach time resolved fluorescence (TRF) hybridization assays which are based in part on the above-described (three previous paragraphs) property of intercalation of specific compounds between the bases of the double-stranded nucleic acid helix. Rabbani et al describe the use of two different intercalators, one of which serves to capture or fix the double-stranded hybrid which is formed between the target polynucleotide and the labeled polynucleotide probe, to a solid surface and a different intercalator, which can act as, an energy donor, or as an energy acceptor, or has attached thereto, a fluorescent compound which serves as either the energy donor or the energy acceptor. The polynucleotide probe is labeled with either chelated lanthanide metals or fluorescent compounds, which serve as either energy donors or energy acceptors. The compounds chosen to serve as energy donors and energy acceptors must be such that transfer of energy can occur efficiently from a compound emitting energy at a first wavelength to a compound which absorbs energy at or near that wavelength and emits time-delayed or time-prolonged detectable energy at a second wavelength.

Gjerde, et al., in U.S. Pat. No. 6,210,885 describes reversible DNA-binding dyes as useful to enhance the detection of double stranded DNA. The term "reversible DNA-binding dye" is used to include DNA intercalator dyes and DNA groove binding dyes. As defined, a "DNA intercalator dye" is a generally planar, aromatic, ring-shaped chromophore molecule which binds to DNA in a reversible, non-covalent fashion, by insertion between the base pairs of the double helix. The term "DNA groove binding dye" is defined herein to mean those chromophore molecules which reversibly bind by direct interaction with the edges of base pairs in either of the grooves (major or minor) of nucleic acids. These dyes are included in the group comprising non-intercalative DNA binding agents. Non-limiting examples of DNA groove binding dyes include Netropsin (N'-(2-amidinoethyl)-4-(2-guanidinoacetamido)-1,1'-dimethyl-N,4'-bi[pyrrole-2-carboxamide]) (Sigma), Hoechst dye no. 33258 (Bisbenzimide, B-2261, Sigma), Hoechst dye no. 33342, (Bisbenzimide, B2261, Sigma), and Hoechst dye no. 2495 (Benzoxanthene yellow, B-9761, Sigma). Preferred reversible DNA-binding dyes in the present invention include fluorescent dyes. Non-limiting examples of reversible DNA-binding dyes include PICO GREEN (P-7581, Molecular Probes), ethidium bromide (E-8751, Sigma), propidium iodide (P-4170, Sigma), Acridine orange (A-6014, Sigma), 7-aminoactinomycin D (A-1310, Molecular Probes), cyanine dyes (e.g., TOTO, YOYO, BOBO, and POPO), SYTO, SYBR Green I, SYBR Green II, SYBR DX, OliGreen, CyQuant GR, SYTOX Green, SYTO9, SYTO10, SYTO17, SYBR14, FUN-1, DEAD Red, Hexidium Iodide, Dihydroethidium, Ethidium Homodimer, 9-Amino-6-Chloro-2-Methoxyacridine, DAPI, DIPI, Indole dye, Imidazole dye, Actinomycin D, Hydroxystilbamidine, and LDS 751. Numerous reversible DNA-binding dyes are described in Handbook of Fluorescent Probes and Research Chemicals, Ch. 8.1 (1997) (Molecular Probes, Inc.); European Patent Application No. EP 0 634 640 A1; Canadian Patent No. CA 2,119,126; and in the following U.S. Pat. Nos. 5,410,030; 5,321,130; 5,432,134; 5,445,946; 4,716,905 (which publications are incorporated by reference herein).

Intercalators according to Acevedo, et al., U.S. Pat. No. 6,060,592, generally include non-carcinogenic, polycyclic aromatic hydrocarbons or heterocyclic moieties capable of intercalating between base pairs formed by a hybrid oligonucleotide/RNA target sequence duplex. Intercalators can include naphthalene, anthracene, phenanthrene, benzonaphthalene, fluorene, carbazole, acridine, pyrene, anthraquinone, quinoline, phenylquinoline, xanthene or 2,7-diazaanthracene groups. Other intercalators believed to be useful are described by Denny, Anti-Cancer Drug Design 1989, 4, 241. Another intercalator is the ligand 6-[[[9-[[6-(4-nitrobenzamido)hexyl]amino]acridin-4-yl]carbonyl]-amino]hexanoylpentafluorophenyl ester.

Bieniarz, et al., in U.S. Pat. No. 6,015,902, in U.S. Pat. No. 5,599,932, in U.S. Pat. No. 5,582,984 and in U.S. Pat. No. 5,808,077, teach compounds which have been found to provide enhanced fluorescence when bound to a DNA molecule within a fluorescent flow cytometry environment which is about eight to ten times brighter in fluorescence than "bis" structure conventional intercalating agents and other known intercalating agents utilized in flow cytometry environment.

The foregoing discussion is not limiting concerning employable intercalating agents.

Minor Groove Binders

In addition to the intercalating types of nucleic acid-binding polymers, the invention also relates to nucleic acid-binding polymers which contain minor groove binders. A minor groove binder is a molecule that binds within the minor groove of the double stranded deoxyribonucleic acid (DNA). Most minor groove binding compounds have a strong preference for A-T (adenine and thymine) rich regions of the B form of double stranded DNA.

Minor groove binders have also been extensively described in the art and all can be used with this invention. Examples of minor groove binders include Hoechst 33258, CDPI.sub.1-3, netropsin, and distamycin. Linkers between a label and the PNA/DNA chimera can be an amide bond, e.g. where the active ester form of a label is coupled with an amino group of the chimera. Also, linkers can comprise alkyldiyl, aryldiyl, or one or more ethyleneoxy units (U.S. Pat. No. 6,469,151). U.S. Pat. No. 6,482,843 describes the minor groove binder plicamycin and U.S. Pat. No. 6,451,588 describes the minor groove binder CDPI.sub.3. U.S. Pat. No. 5,801,155 describes covalently linked oligonucleotide minor groove binder conjugates. The U.S. Pat. No. 5,801,155 patent describes that naturally occuring compounds such as as netropsin, distamycin and lexitropsin, mithramycin, chromomycin A.sub.3, olivomycin, anthramycin, sibiromycin, as well as further related antibiotics and synthetic derivatives are minor groove binders. Certain bisquarternary ammonium heterocyclic compounds, diarylamidines such as pentamidine, stilbamidine and berenil, CC-1065 and related pyrroloindole and indole polypeptides, Hoechst 33258, 4'-6-diamidino-2-phenylindole (DAPI) as well as a number of oligopeptides consisting of naturally occurring or synthetic amino acids are also minor groove binder compounds.

Intercalating molecules or agents are typically distinguished from minor groove binders on the basis that the intercalating agents are generally flat aromatic (preferably polycyclic) molecules versus the typical "crescent shape" or analogous geometry of the minor groove binders. An experimental distinction can also be made by NMR spectroscopy utilizing the nuclear Overhauser effect. But all are useful.

In addition to the molecular structure which causes minor groove binding, the minor groove binder moiety may also carry additional functions, as long as those functions do not interfere with minor groove binding ability. For example a reporter group, which makes the minor groove binder readily detectable by color, uv spectrum or other readily discernible physical or chemical characteristics, may be covalently attached to the minor groove binder moiety. An example for such a reporter group is a diazobenzene function which in the example of a preferred embodiment is attached to a carbonyl function of the minor groove binder through a —HN(CH.sub.2).sub.m COO(CH.sub.2).sub.m S(CH.sub.2).sub.m— bridge. Again, the reporter group or other like function carried by the minor groove binder can also be conceptualized as part of the minor groove binder moiety itself.

U.S. Pat. No. 5,693,463 describes netropsin a naturally-occurring oligopeptide that binds to the minor groove of double-stranded DNA. Netropsin contains two 4-amino-1-methylpyrrole-2-carboxylate residues and belongs to a family of similar biological metabolites from Streptomyces spp. This family includes distamycin, anthelvencin (both of which contain three N-methylpyrrole residues), noformycin, amidomycin (both of which contain one N-methylpyrrole residue) and kikumycin (which contains two N-methylpyrrole residues, like netropsin) (Debart, et al.). Synthetic molecules of this family have also been described, including the above-mentioned molecules (Lown, et al. 1985) well as dimeric derivatives (Griffin et al., Gurskii, et al.) and certain analogues (Bialer, et al. 1980, Bialer, et al. 1981, Krowicki, et al.).

Among the synthetic analogs of netropsin and distamycin are oligopeptides that have been designed to have sequence preferences different from their parent molecules. Such oligopeptides include the "lexitropsin" series of analogues. The N-methylpyrrole groups of the netropsin series were systematically replaced with N-methylimidazole residues, resulting in lexitropsins with increased and altered sequence specificities from the parent compounds. Further, a number of poly(N-methylpyrrolyl)netropsin analogues have been designed and synthesized which extend the number of residues in the oligopeptides to increase the size of the binding site (Dervan, 1986).

Non-intercalating minor groove DNA-binding molecules include, but are not limited to the following: distamycin A, netropsin, mithramycin, chromomycin and oligomycin, which are used as antitumor agents and antibiotics; and synthetic antitumor agents such as berenil, phthalanilides, aromatic bisguanylhydrazones and bisquaternary ammonium heterocycles (for review, see Baguley, 1982). Non-intercalating DNA-binding molecules vary greatly in structure: for example, the netropsin-distamycin series are oligopeptides compared to the diarylamidines berenil and stilbamidine.

A third category of DNA-binding molecules includes molecules that have both groove-binding and intercalating properties. DNA-binding molecules that have both intercalating and minor groove binding properties include actinomycin D (Goodisman, et al.), echinomycin (Fox, et al. 1990), triostin A (Wang, et al.), and luzopeptin (Fox, 1988). In general, these molecules have one or two planar polycyclic moieties and one or two cyclic oligopeptides. Luzopeptins, for instance, contain two substituted quinoline chromophores linked by a cyclic decadepsipeptide. They are closely related to the quinoxaline family, which includes echinomycin and triostin A, although they luzopeptins have ten amino acids in the cyclic peptide, while the quinoxaline family members have eight amino acids.

In addition to the major classes of DNA-binding molecules, there are also some small inorganic molecules, such as cobalt hexamine, which is known to induce Z-DNA formation in regions that contain repetitive GC sequences (Gessner et al.). Another example is cisplatin, cis-di-aminedichloroplatinum(II), which is a widely used anticancer therapeutic. Cisplatin forms a covalent intrastrand crosslink between the N7 atoms of adjacent guanosines (Rice, et al.).

The molecules that can be tested in the assay for sequence preference/specificity and relative affinity to different DNA sites include both major and minor groove binding molecules as well as intercalating and non-intercalating DNA binding molecules.

Distamycin is a member of a family of non-intercalating minor groove DNA-binding oligopeptides that are composed of repeating units of N-methylpyrrole groups. Distamycin has 3 N-methylpyrrole groups. Daunomycin is a member of an entirely different class of DNA-binding molecules, the anthracycline antibiotics, that bind to DNA via intercalation. Examples of homopolymers would be bis-distamycin, the dimer of distamycin, a molecule containing 6 N-methylpyrrole groups or tris-distamycin, the trimer of distamycin, a molecule containing 9 N-methylpyrrole groups. Heteropolymers are molecules composed of different types of DNA-binding subunits; for example, compounds composed of a distamycin molecule linked to a daunomycin molecule or a distamycin molecule linked to two daunomycin molecules. The term "oligomeric" is being used to describe molecules comprised of linked subunits each of which may be smaller than the parent compound.

DNA groove binding dyes can also be used. U.S. Pat. No. 6,210,885 describes non-limiting examples of reversible DNA binding dyes which include PICO GREEN, ethidium bromide, propidium iodide, Acridine orange, 7-aminoactinomycin D, cyanine dyes, Bisbenzimide, Benzoxanthene yellow, Netropsin, SYTO, SYBR Green I, SYBR Green II, SYBR DX, CyQuant GR, SYTOX Green, SYTO9, SYTO10, STO17, SYPR14, FUN-1, DEAD Red, Hexidium Iodide, Dihydroethidium, Ethidium Homodimer, 9-Amino-6-Chloro-2-Methoxyacridine, DAPI, DIPI, Indole dye, Imidazole dye, Actinomycin D, Hydroxystilbamidine, and LDS 751.

Non-limiting examples of DNA groove binding dyes include Netropsin (N'-(2-amidinoethyl)-4-(2-guanidinoacetamido)-1,1'-dimethyl-N,4'-bi[pyrrole-2-carboxamide]) (Sigma), Hoechst dye no. 33258 (Bisbenzimide, B-2261, Sigma), Hoechst dye no. 33342, (Bisbenzimide, B2261, Sigma), and Hoechst dye no. 2495 (Benzoxanthene yellow, B-9761, Sigma). Preferred reversible DNA-binding dyes in the present invention include fluorescent dyes. Non-limiting examples of reversible DNA-binding dyes include PICO GREEN (P-7581, Molecular Probes), ethidium bromide (E-8751, Sigma), propidium iodide (P-4170, Sigma), Acridine orange (A-6014, Sigma), 7-aminoactinomycin D (A-1310, Molecular Probes), cyanine dyes (e.g., TOTO, YOYO, BOBO, and POPO), SYTO, SYBR Green I, SYBR Green II, SYBR DX, OliGreen, CyQuant GR, SYTOX Green, SYTO9, SYTO10, SYTO17, SYBR14, FUN-1, DEAD Red, Hexidium Iodide, Dihydroethidium, Ethidium Homodimer, 9-Amino-6-Chloro-2-Methoxyacridine, DAPI, DIPI, Indole dye, Imidazole dye, Actinomycin D, Hydroxystilbamidine, and LDS 751. Numerous reversible DNA-binding dyes are described in Handbook of Fluorescent Probes and Research Chemicals, Ch. 8.1 (1997) (Molecular Probes, Inc.); European Patent Application No. EP 0 634 640 A1; Canadian Patent No. CA 2,119,126; and in the following U.S. Pat. Nos. 5,410,030; 5,321,130; 5,432,134; 5,445,946; 4,716,905.

Linking Moieties (Bifunctional Linkers)

Linking moieties or the bifunctional linkers are compounds which can be used to link the nucleic acid binding agent, e.g., intercalating agent to the backbone polymer, e.g, polyacrylamide. A list of commonly used linking agents (bifunctional linkers) is shown in Table 2. Linkers include any of a variety of compounds which can form an amide, ester, ether, thioether, carbamate, urea, amine or other linkage, e.g., which are commonly used for immobilization in affinity chromatography.

In a preferred process for making the polymers of this invention, modified acrylamide monomers are made and used in the polymerization to form the intercalator modified LPA in an efficient process or any other conventional manner. For example, a derivative of acrylic acid is reacted with a linker. The product of this reaction is then reacted with the intercalator. These reactions are simple condensation reactions well known in the art. The resultant modified monomer is then mixed with acrylamide or a derivative thereof, and the polymerization is catalyzed using the standard methods for forming polyacrylamides. The formed polymer is then precipitated from solution, isolated, and resuspended for use in accordance with the invention, e.g., reaction with the nucleic acid in aqueous solution.

After the polyacrylamide polymer is added to a nucleic acid containing solution, the nucleic acid will bind to the polyacrylamide polymer and form a complex which can then be removed from solution by conventionally, e.g., adding a 50% ethanol solution to precipitate the polymer. Selective filtration steps may also be used in the absence of centrifugation to collect, wash, and resuspend the nucleic acid bound to the insoluble polymer. All this is conventional.

For purposes of further manipulations of the nucleic acid bound to the polymer, the polymer can be redissolved in an aqueous solution and used directly in PCR or further manipulated. The amount of intercalator in the LPA or other backbone polymers does not inhibit regular PCR reactions or fluorescent signal acquisition during real-time PCR.

Without further elaboration, it is believed that one skilled in the art, using the preceding description, could utilize the present invention to its fullest extent. The following specific preferred embodiment is therefore, to be construed as merely illustrative, and not limitative of the disclosure in any way whatsoever.

EXAMPLES

Example 1

In a preferred embodiment of the invention, a nucleic acid binding polymer comprising linear polyacrylamide linked with the intercalating agent, e.g., psoralen was prepared as described below.

In the first step, the derivatized acrylamide monomer is prepared. This step serves to link the intercalating agent (such as psoralen) to the acrylamide monomer by a linking moiety. For the synthesis of the acrylamide monomer, 0.25 mL (1.2 mmol) of 5-N-Boc-1,5-diaminopentane was dissolved in 1 mL dimethylformamide. To this solution was added 0.23 g (1.4 mmol) of acrylic acid N-hydroxysuccinimide ester and the reaction was allowed to stir under $N_2$ overnight. The reaction mixture was then diluted with 25 mL $CH_2Cl_2$ and washed with equal volumes of saturated $NaHCO_3$(aq) and brine. The separated organic phase was dried with anhydrous sodium sulfate, filtered, and condensed by rotary evaporation. The yellow oil was dried on a vacuum pump overnight.

The crude oil was then dissolved in 2 mL $CH_2Cl_2$ and treated with 2 mL (26 mmol) of trifluoroacetic acid. The reaction mixture was allowed to stir under N2 for 60 min and was then diluted with 25 mL $CH_2Cl_2$. The reaction mixture was then neutralized with saturated $NaHCO_3$(aq). The organic phase was separated, washed and saturated with $NaHCO_3$ (aq) and then brine. The organic phase was then dried with anhydrous sodium sulfate, filtered and condensed by rotary evaporation. The yellow oil was then dissolved in 2 mL dimethylformamide and 500 μL triethylamine. To this solution was added a solution of 50 mg (0.13 mmol) of succinimidyl-[4(psoralen-8-yloxy)]-butyrate in 500 μL dimethylformamide. This reaction was allowed to stir under $N_2$ overnight. The reaction mixture was then diluted in 50 mL toluene and condensed under rotary evarporation to remove the dimethylformamide. 0.12 g of oily residue was dissolved in 2 mL dimethylsulfoxide and used for polymerization with acrylamide.

After the derivatized acrylamide monomer is prepared, it is polymerized into the LPA-intercalating polymer which will contain the doped in intercalating agent. For preparation of the LPA-intercalating polymer, 2.5 g acrylamide is dissolved in 2 mL 40 mM Tris HCL, 333 μl 20 mM sodium acetate, and 50 μL 1 mM EDTA. The solution is then diluted to 50 mL with water. 500 ml of this solution is mixed with 10 mL of the 60 mg/ml psoralen monomer solution from above and 5 ml of 10% ammonium persulfate and 0.5 mL of N,N,N',N'-tetramethylethylenediamine (TEMED). The solution is allowed to react for 60 minutes. The solution is then split equally into four tubes and 2.5 volumes of ethanol is added for analysis. The solutions are then centrifuged for 10 minutes at 10,000 rpm to retrieve the polymer. The pellet is then collected and resuspended in 1 mL of water.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modification of the invention to adapt it to various usages and conditions.

The entire disclosure or all applications, patents and publications, cited above and below are hereby incorporated by reference.

TABLE 1

| Intercalating Agents |
| --- |
| ethidium |
| ethidium bromide |
| methidium |

TABLE 1-continued

Intercalating Agents acridine
aminoacridine
acridine orange and derivatives therof
psoralen
proflavin
ellipticine
actinomycin D
daunomycin
malachite green
phenyl neutral red
mitomycin C
HOECHST 33342
HOECHST 33258
aclarubicin
DAPI
SYBR
Adriamycin
pirarubicin
actinomycin
tris (phenanthroline) zinc salt
tris (phenanthroline) ruthenium salt
tris (phenantroline) cobalt salt
di (phenanthroline) zinc salt
di (phenanthroline) ruthenium salt
di (phenanthroline) cobalt salt
bipyridine platinum salt
terpyridine platinum salt
phenanthroline platinum salt
tris (bipyridyl) zinc salt
tris (bipyridyl) ruthenium salt
tris (bipyridyl) cobalt salt
di (bipyridyl) zinc salt
di (bipyridyl) ruthenium salt
di (bipyridyl) cobalt salt.

TABLE 2

LINKING AGENTS

N-Boc-1,3-diaminopropane
N-Boc-1,4-diaminobutane
N-Boc-1,5-diaminopentane
N-Boc-1,6-diaminohexane
3-(Boc-amino)-1-propanol
4-(Boc-amino)-1-butanol
5-(Boc-amino)-1-pentanol
6-(Boc-amino)-1-hexanol
Nα-Boc-L-lysine
Nϵ-Boc-L-lysine
Nα-Boc-L-serine methyl ester

What is claimed is:

1. A water soluble nucleic acid binding polymer comprising a backbone polymer and a nucleic acid binding agent, wherein the backbone polymer is not a polynucleotide, and wherein said nucleic acid binding agent is an intercalating agent or a minor groove binder.

2. The nucleic acid binding polymer of claim 1, comprising a bifunctional linker.

3. The nucleic acid binding polymer of claim 2, wherein said nucleic acid binding polymer binds in aqueous solution to a nucleic acid by hydrogen, electrostatic or cationic binding.

4. The nucleic acid binding polymer of claim 3, wherein said nucleic acid is DNA, RNA, or a hybrid thereof.

5. The nucleic acid binding polymer of claim 3, wherein said nucleic acid binding polymer remains soluble after binding to a nucleic acid.

6. A water soluble nucleic acid binding polymer comprising a backbone polymer and a nucleic acid binding agent, wherein said backbone polymer is linear polyacrylamide, and wherein said nucleic acid binding agent is an intercalating agent or a minor groove binder.

7. The nucleic acid binding polymer of claim 1, wherein said nucleic acid binding agent is both an intercalating agent and a minor groove binder.

8. The nucleic acid binding polymer of claim 1, wherein said intercalating agent is ethidium, ethidium bromide, methidium acridine, aminoacridine, acridine orange and derivatives thereof, psoralen, proflavin, ellipticine, actinomycin D, daunomycin, malachite green, phenyl neutral red, mitomycin C, HOECHST 33342, HOECHST 33258, aclarubicin, DAPI, SYBR, Adriamycin, pirarubicin, actinomycin, tris (phenanthroline) zinc salt, tris (phenanthroline) ruthenium salt, tris (phenantroline) cobalt salt, di (phenanthroline) zinc salt, di (phenanthroline) ruthenium salt, di (phenanthroline) cobalt salt, bipyridine platinum salt, terpyridine platinum salt, phenanthroline platinum salt, tris (bipyridyl) zinc salt, tris (bipyridyl) ruthenium salt, tris (bipyridyl) cobalt salt, di (bipyridyl) zinc salt, di (bipyridyl) ruthenium salt or di (bipyridyl) cobalt salt.

9. The nucleic acid binding polymer of claim 1, wherein said intercalating agent is psoralen.

10. The nucleic acid binding polymer of claim 1, wherein said minor groove binder is Hoechst 33258, $CDPI_{1-3}$, netropsin, distamycin A, lexitropsin, mithramycin, chromomycin $A_3$, olivomycin, anthramycin, sibriomycin, bisquaternary ammonium heterocyclic compound, pentamidine, berenil, phthalanilide, stilbamidine, or DAPI.

11. The nucleic acid binding polymer of claim 2, wherein said bifunctional linker is N-Boc-1,3-diaminopropane, N-Boc-1,4-diaminobutane, N-Boc-1,5-diaminopentane, N-Boc- 1,6-diaminohexane, 3-(Boc-amino)-1-propanol, 4-(Boc-amino)-1-butanol, 5-(Boc-amino)-1-pentanol, 6-(Boc-amino)-1-hexanol, Nα-Boc-L-lysine, NE-Boc-L-lysine, or Nα-Boc-L-serine methyl ester.

12. The nucleic acid binding polymer of claim 2, wherein said bifunctional linker is linked to the nucleic acid binding agent by an amide, ester, thioether, carbamate, urea or amine bond.

13. The nucleic acid binding polymer of claim 1, wherein said backbone polymer comprises pendant OH, $NH_2$, COOH, or quaternary ammonium groups having at least one H atom.

14. A water soluble nucleic acid binding polymer comprising a backbone polymer and a nucleic acid binding agent, wherein said backbone polymer comprises monomers which include acrylic acid, acrylamide, an acrylate, a glycol, an amino acid, or a substituted styrene, and wherein said nucleic acid binding agent is an intercalating agent or a minor groove binder.

15. The nucleic acid binding polymer of claim 14, wherein said polymer is a derivatized acrylamide.

16. The nucleic acid binding polymer of claim 2, wherein said bifunctional linker is in about a 1:1 mole ratio with the nucleic acid binding agent.

17. A nucleic acid binding polymer comprising:
a backbone polymer comprising polyacrylamide; and
a nucleic acid binding agent linked to the backbone polymer, wherein the nucleic acid binding agent binds a double-stranded segment of a nucleic acid preferen tially to a single-stranded segment of a nucleic acid, and wherein said nucleic acid binding agent is an intercalating agent or a minor groove binder.

18. The nucleic acid binding polymer of claim 17, wherein the nucleic acid binding agent is linked to the backbone polymer by a bifunctional linker.

19. The nucleic acid binding polymer of claim 18, wherein the bifunctional linker comprises a moiety selected from the group consisting of: —NH—$(CH_2)_3$—NH—, —NH—$(CH_2)_4$—NH—, —NH—$(CH_2)_5$—NH—, —NH—$(CH_2)_6$—NH—, —O—$(CH_2)_3$—NH—, —O—$(CH_2)_3$—NH—, —O—$(CH_2)_5$—NH-, —O—$(CH_2)_3$—NH—, —NH—CH($CO_2H$)—$(CH_2)_4$NH—, and —O—$CH_2$—CH($CO_2H$)—NH—.

20. The nucleic acid binding polymer of claim 17, wherein the polymer includes a moiety having the formula:

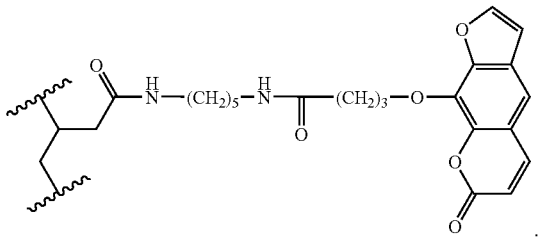

* * * * *